Aug. 9, 1949.

C. L. BROWN 2,478,233

POST HOLE DIGGER

Filed June 2, 1945

2 Sheets-Sheet 1

INVENTOR.
CHARLES L. BROWN.
BY
Martin E. Anderson
ATTORNEY.

Aug. 9, 1949.     C. L. BROWN     2,478,233
POST HOLE DIGGER

Filed June 2, 1945     2 Sheets-Sheet 2

INVENTOR.
CHARLES L. BROWN.
BY
Martin E. Anderson
ATTORNEY.

Patented Aug. 9, 1949

2,478,233

UNITED STATES PATENT OFFICE 2,478,233

POSTHOLE DIGGER

Charles L. Brown, Pueblo, Colo.

Application June 2, 1945, Serial No. 597,299

1 Claim. (Cl. 255—19)

This invention relates to improvements in post hole diggers of the type constructed as attachments for tractors.

The use of mechanical tractors on the farms is very prevalent and many attachments have been invented to increase the usefulness of such tractors.

On farms and ranches it is frequently necessary to build fences and this requires the digging of a large number of post holes which has usually been performed by hand tools, such as spades and other hand operated diggers.

It is the object of this invention to produce a simple and substantial mechanism that can be readily attached to a tractor of any standard make that is provided with power takeoff and with pumps for delivering oil under pressure and which can be used for digging post holes whereever desired.

Figure 1:
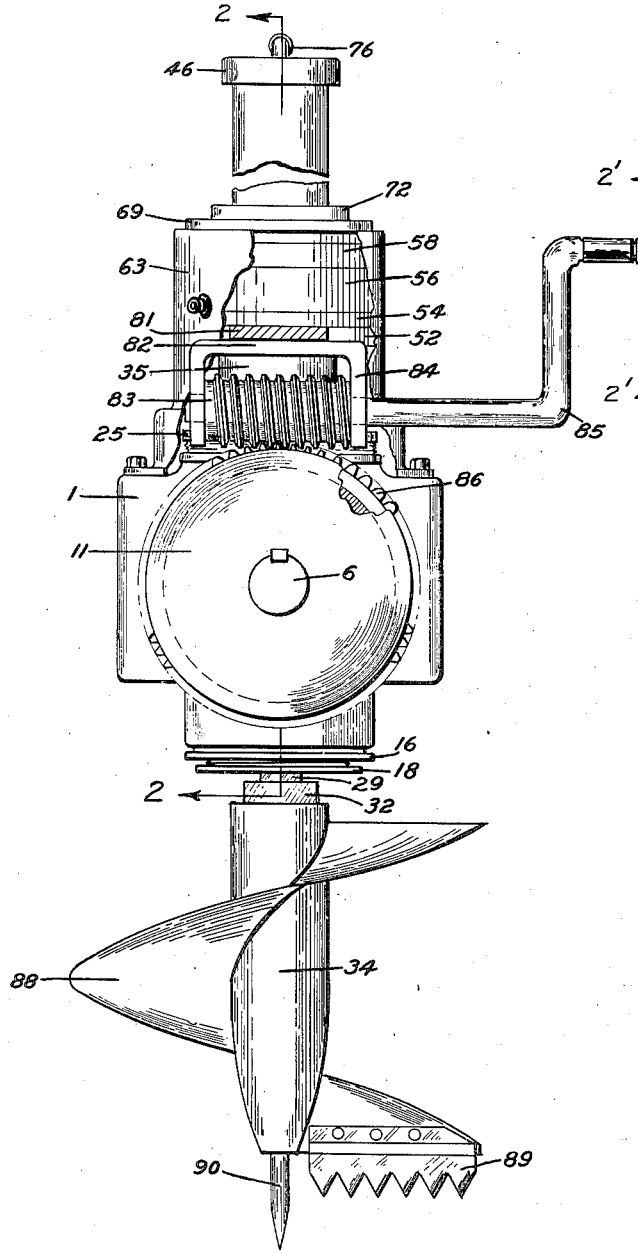
Figure 2:
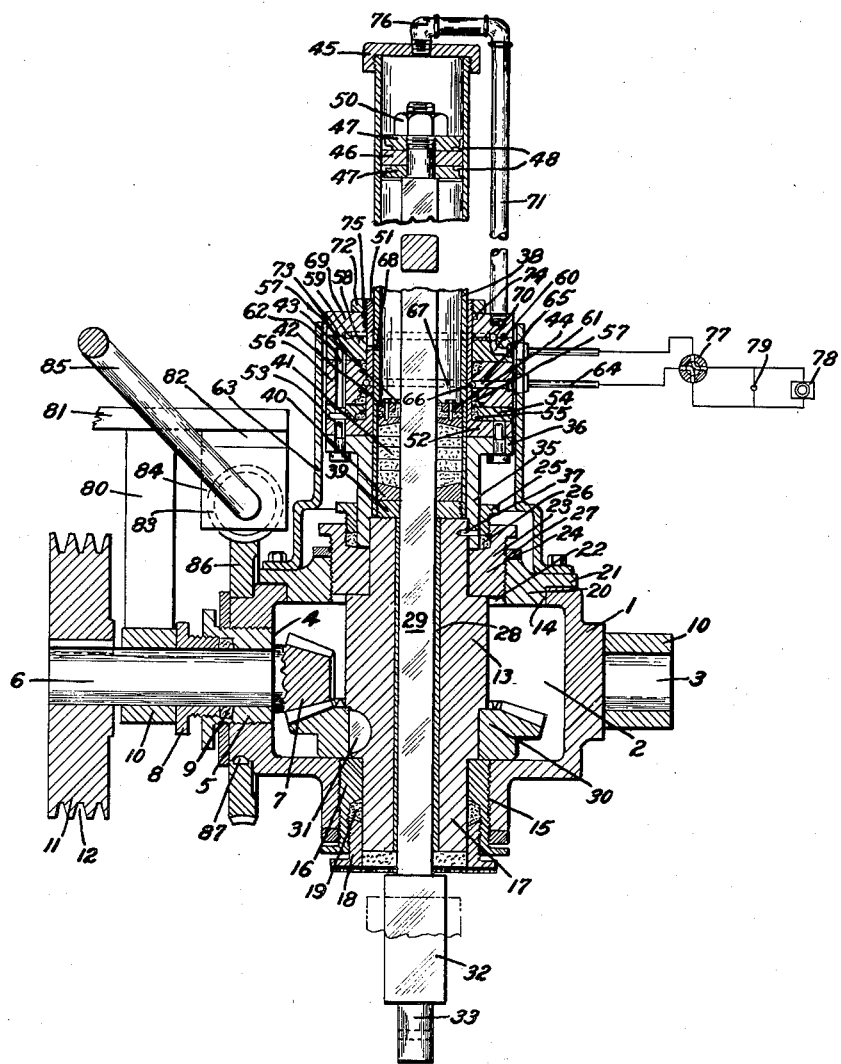

In order to describe this invention so that it may be readily understood, reference will now be had to the accompanying drawings in which:

Figure 1 is a side elevation of the invention, portions being broken away to better disclose the construction; and Figure 2 is a longitudinal section taken on line 2—2, Figure 1, a portion being shown in elevation looking through plane 2'—2'.

In the drawing reference numeral 1 designates a body or housing having a central compartment 2 and provided on one side with a trunnion 3. Diametrically opposite and in axial alignment with trunnion 3 is an opening 4 in which a bearing block 5 is threadedly connected. A shaft 6 is journaled in the bearing and is provided at its inner end with a pinion 7. A cooperating bearing block and gasket compressing nut 8 is threadedly connected with bearing block 5 and serves to compress the packing material 9. A supporting bracket 80, 81 having two spaced bearings 10 is rigidly connected with the frame of a tractor which has a power takeoff and a pressure pump, in the manner now common. The bearing to the right in Figure 2 receives the trunnion 3 and the bearing to the left, the shaft 6. The whole assembly can be rotated about the axis of shaft 6 in manner which will hereinafter appear. Secured to the outer end of shaft 6 is a pulley 11 having a number of V-grooves 12 for the reception of belts that are driven from the power takeoff of the tractor. A drive hub 13 is rotatably mounted on the housing which is provided with aligned openings 14 and 15 through which the hub is inserted and removed. A bearing block 16 is threadedly connected with opening 15 and receives the cylindrical journal 17 of hub 13. A compressor nut 18 serves to compress the packing material 19. Positioned in opening 14 is a housing plate 20 that is provided with a flange 21 and a central opening 22. Threadedly connected with the wall of opening 22 is an annular block 23 that serves as a bearing for the reduced cylindrical extension 24 of hub 13. A compressor nut 25 serves to compress the gasket 26. A lock nut 27 holds the bearing block 23 in adjusted position. Hub 13 is provided with an axial opening of square or some other noncircular cross section and a babbitt liner 28. A shaft 29, of a cross section corresponding to the hub opening, is mounted for reciprocation in the liner. Secured to the hub is a bevel gear 30 that is operatively related to and connected with pinion 7. This gear is held against rotation on the hub by means of a key 31. It is now evident that whenever pulley 11 is rotated, it will impart a corresponding rotation to the hub and to the shaft that is operatively connected therewith. the lower end of shaft 29 is provided with a square section 32 whose lower end terminates in a cylindrical section 33. A dirt auger 34 is operatively connected with sections 32 and 33.

A coupling having a cylindrical portion 35 and a radial flange 36 is telescopically connected with the upper reduced cylindrical extension 24 of hub 13 and is held against relative rotation therewith by means of one or more pins 37. Cylinder 38 has its lower end positioned in the cylindrical portion 35, and is provided at its lower end with a threaded section in which ring 39 is secured. Packing gland 40 rests on the upper surface of ring 39 and supports the special packing 41. Packing ring 42 is provided with a cup leather 43 that forms a seal with the shaft 29. Ring 42 rests against an internal shoulder on the cylinder. The cup leather is held in position by means of a packing gland 44. The stuffing box or packing that has just been described forms a liquid tight seal at the bottom of the operative portion of the cylinder. The upper end of the cylinder is closed by means of a cap 45. Secured to the upper end of shaft 29, is a piston comprising a central plate 46 and two rings 47, each of which is provided with a cup leather 48. The piston is clamped between shoulder 49 and nut 50. It is evident that if oil under pressure is introduced into the cylinder below the piston, the latter will move upwardly and if oil is introduced between the piston and cap 45, it will exert a force tending to move the piston downwardly.

Positioned above flange 36 is a cylindrical member 51 that is provided at its lower end with a flange 52. This flange is connected with flange 36 by means of tap screws 53 and therefore the two parts are held against relative rotation. Positioned above flange 52 is an annular seal comprising the ring 54 with its cup leather 55 and positioned above this is another ring which has been designated by reference numeral 56 and which is substantially twice as thick as ring 54. Ring 56 is provided with cup leathers 57 at the top and at the bottom. Positioned above ring 56 is ring 58 that is provided on its upper surface with an annular semi-cylindrical groove 59. Ring 58 has an opening 60, whose outer end is threaded for the reception of a pipe 61. The rings designated by reference numerals 54, 56 and 58 are interconnected and held against relative rotation by means of one or more pins 62. Rings 58 and 56 are held against relative rotation with respect to the housing 63 by means of pipes 61 and 64. The latter pipe has its inner end in threaded connection with the walls of opening 65 in ring 56. The inner surface of ring 56 has a semi-circular groove 66 that co-operates with a similar groove in the outer surface of sleeve 51 so as to provide a channel or passage extending completely around the outer surface of the sleeve. Opening 67 connects the channel 66 with the interior of the cylinder near the liquid seal at the bottom of the cylinder. It is now apparent that if oil under pressure is introduced through pipe 64, it will pass into the cylinder below the piston and move the latter upwardly. The cylinder and cylindrical member 51 are interconnected by means of one or more pins 68 which to prevent relative rotation. Positioned above ring 58 is a ring 69 that is provided in its under surface with an annular semi-cylindrical groove that registers with groove 59 to form a circular channel. An opening 70 connects the circular channel 59 with an upwardly extending pipe 71. A clamping ring 72 is threadedly connected with the upper end of sleeve 51 and urges ring 59 downwardly into engagement with ring 58. A circular packing 73 prevents liquid from escaping outwardly. Clamping ring 72 engages a ring 74 of packing material. Ring 69 is held against rotation with respect to the cylindrical sleeve 51 by means of a key 75 or some other equivalent means.

It has already been explained that rings 54, 56 and 58 are held against relative rotation with respect to the housing 63 by the pipes and the pin 62. Since ring 69 is secured to cylindrical sleeve 51 and held against rotation relative thereto and relative to the cylinder, it is evident that whenever the cylinder is rotated there will be relative rotation between rings 58 and 69. Pipe 71 extends upwardly and terminates in a downwardly projecting pipe fitting 76 that is threadedly connected with cap 45. The interior of pipe 61 is therefore always connected with the interior of the cylinder at a point above the piston.

Pipes 61 and 64 are connected with a 4-way valve 77 which, in turn, is connected with a pressure pump 78 in the manner indicated in Figure 2. Since pump 78 always operates, a by-pass 79 is provided so as to permit the liquid to flow from the outlet to the inlet ports during the time that the 4-way valve is closed. Pumps on tractors are always provided with a valve corresponding to valve 79.

It has already been pointed out that the bearings 10 are secured to the tractor in some suitable way. Extending upwardly from bearings 10 is a rigid bracket 80 that has a laterally extending portion 81 connected with the tractor. A U-shaped member 82 is connected with bracket 81 by welding or other means. A worm 83 is rotatably connected to the U-shaped member and mounted for rotation in bearings provided therefor in the downwardly extending limbs 84. A crank 85 is connected with the worm and the worm is operatively connected with the worm gear 86. Since worm gear 86 is nonrotatably connected with the body 1 by means of the key 87, it is evident that whenever crank 85 is operated to turn the worm, the housing 1 will be made to rotate about the axis of trunnion 3 in shaft 6 and in this way it can be inclined with respect to the tractor to which bearings 10 are connected. This inclination is useful to make it possible to drill a vertical post hole on land that is inclined. The auger 34 is provided with a helical blade 88 that terminates in a serrated cutter 89 and a point 90.

Let us now assume that the mechanism above described is secured to a tractor and that by means of crank 85, it is adjusted into vertical position and that at the same time the piston is held in its uppermost position so as to support the point 90 above the ground surface. By means of the power takeoff, pulley 11 is now rotated, thereby turning the hub 13 and the auger in a direction to make the serrated edge 89 the leading edge of the blade. The 4-way valve is now operated so as to admit oil to the top of the piston and at the same time allow the oil underneath the piston to return to the pump. The pressure of the oil moves the parts downwardly and forces the auger into the ground while it is rotated. The speed at which the auger is forced into the ground can be regulated by the operator who controls the openings in valve 77. When the hole has been dug as deep as desired, the 4-way valve is reversed, thereby lifting the auger up out of the ground and carrying with it all of the dirt that has been cut loose during the downward movement. The tractor with the attachment secured thereto is then moved to a position where the next hole is to be dug and the operation repeated.

Due to the fact that shaft 29 can be raised and lowered to a greater extent than the depth to which the holes are usually dug, no other means has been provided for raising and lowering the mechanism.

In the above description the word "tractor" has been employed in its broadest sense and it is to be understood that any suitable machine having a power takeoff can be used. In fact any vehicle having an engine capable of being connected to the digger and operating it can be used. It is contemplated, of course, that the machine shall be used with an ordinary farm tractor of any kind, or in connection with a truck.

The machine can dig holes of various sizes from eight inches or smaller, to two feet. The size of hole depends on the size of the ground auger used, and of any depth up to eight feet which is the capacity of the present machine. The depth to which it will operate depends on the length of the cylinder and shaft 29.

Having described the invention, what is claimed as new is:

In a post hole digger attachment for use with tractors having a power take-off, a pressure pump, a housing, vertically spaced axially aligned bearings carried by the housing, a hub mounted in the bearings, means for turning the hub with power derived from the tractor, the hub having an axial noncircular bore, and an auger shaft of a corresponding noncircular cross section extending through said bore, means for feeding the auger shaft and for raising it, comprising a cylinder attached to the upper end of the hub, in axial alignment therewith and for conjoint rotation therewith, the upper end of the auger shaft terminating in the cylinder, a stuffing box at the lower end of the cylinder, a piston carried by the upper end of the auger shaft additional bearing means for said cylinder connected to the housing, fluid passages in said last mentioned bearing means, conduits connecting said pump to said housing, said conduit being respectively aligned with said passages, means providing a fluid conduit from one of said passages to the upper end of said cylinder, means providing a fluid conduit from the other of said passages to the lower end of said cylinder, and valve means interposed in the conduits which connect the pump to the housing to selectively control the flow of fluid to the cylinder to force liquid under pressure to one side of the piston and remove it from the other side thereof or vice versa while the cylinder is rotating in the housing.

CHARLES L. BROWN.

REFERENCES CITED

The following references are of record in the file of this patent:

UNITED STATES PATENTS

| Number | Name | Date |
| --- | --- | --- |
| 557,686 | Meissner | Apr. 7, 1896 |
| 1,612,226 | Sheldon | Dec. 28, 1926 |
| 1,627,539 | Halleck | May 3, 1927 |
| 1,692,431 | Anderson | Nov. 20, 1928 |
| 1,887,172 | Smith et al. | Nov. 8, 1932 |